United States Patent
Park et al.

(10) Patent No.: US 9,930,655 B2
(45) Date of Patent: Mar. 27, 2018

(54) METHOD OF PERFORMING MEASUREMENT AT UE IN WIRELESS COMMUNICATION SYSTEM AND APPARATUS THEREOF

(71) Applicant: LG ELECTRONICS INC., Seoul (KR)

(72) Inventors: Jonghyun Park, Anyang-si (KR); Inkwon Seo, Anyang-si (KR); Hyungtae Kim, Anyang-si (KR); Hanbyul Seo, Anyang-si (KR); Seungmin Lee, Anyang-si (KR); Kijun Kim, Anyang-si (KR); Youngseob Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 14/956,646

(22) Filed: Dec. 2, 2015

(65) Prior Publication Data
US 2016/0165580 A1  Jun. 9, 2016

Related U.S. Application Data

(63) Continuation of application No. 13/992,520, filed as application No. PCT/KR2012/000832 on Feb. 6, 2012, now Pat. No. 9,332,560.

(60) Provisional application No. 61/445,534, filed on Feb. 22, 2011, provisional application No. 61/446,497, filed on Feb. 24, 2011.

(30) Foreign Application Priority Data

Jan. 16, 2012 (KR) .................. 10-2012-0004970

(51) Int. Cl.
| | | |
|---|---|---|
| *H04W 72/04* | (2009.01) | |
| *H04W 72/08* | (2009.01) | |
| *H04W 52/24* | (2009.01) | |
| *H04B 7/0417* | (2017.01) | |
| *H04L 5/00* | (2006.01) | |
| *H04L 25/02* | (2006.01) | |
| *H04W 52/14* | (2009.01) | |
| *H04W 52/40* | (2009.01) | |
| *H04W 88/08* | (2009.01) | |

(52) U.S. Cl.
CPC ........ *H04W 72/042* (2013.01); *H04B 7/0417* (2013.01); *H04L 5/0023* (2013.01); *H04L 5/0048* (2013.01); *H04L 5/0057* (2013.01); *H04W 52/242* (2013.01); *H04W 72/0413* (2013.01); *H04W 72/08* (2013.01); *H04W 72/085* (2013.01); *H04L 5/005* (2013.01); *H04L 5/0007* (2013.01); *H04L 5/0051* (2013.01); *H04L 25/0224* (2013.01); *H04W 52/146* (2013.01); *H04W 52/40* (2013.01); *H04W 88/085* (2013.01)

(58) Field of Classification Search
CPC .......... H04W 72/042; H04W 72/0413; H04W 72/08
USPC .................................................. 370/328, 329
See application file for complete search history.

(56) References Cited

U.S. PATENT DOCUMENTS

| | | | | |
|---|---|---|---|---|
| 2010/0254471 | A1* | 10/2010 | Ko ........................ | H04L 5/0023 375/260 |
| 2011/0032839 | A1* | 2/2011 | Chen ...................... | H04B 7/024 370/252 |
| 2011/0170496 | A1 | 7/2011 | Fong et al. .................. | 370/329 |
| 2011/0244877 | A1 | 10/2011 | Farajidana et al. ........ | 455/452.2 |
| 2012/0176939 | A1* | 7/2012 | Qu ........................ | H04L 5/0023 370/255 |

FOREIGN PATENT DOCUMENTS

| | | |
|---|---|---|
| CN | 101877608 A | 11/2010 |
| CN | 101924610 A | 12/2010 |
| TW | 200829043 A | 7/2008 |
| TW | 201012280 A1 | 3/2010 |
| TW | 201021453 A1 | 6/2010 |
| TW | 201106747 A1 | 2/2011 |
| WO | 2011/018121 A1 | 2/2011 |

OTHER PUBLICATIONS

Marvell: "High level views for CoMP Feedback for Release 11", 3GPP TSG-RAN WG1 #63bis, R1-110268, Dublin, Ireland, Jan. 21, 2011.
Qualcomm Incorporated: "Signaling and Configuration of CSI-RS", 3GPP TSG-RAN WG1 #62, R1-104797, Madrid, Spain, Aug. 27, 2010.
R1-110573, "Views on Rel-11 CoMP," 3GPP TSG RAN WG1 Meeting #63bis, Jan. 21, 2011, section 2.3.
R!-105882, "Discussion on CSI-RS collision avoidance," 3GPP TSG-RAN WG1 #63, Nov. 19, 2010, section 3.
R1-110461, "Baseline Schemes and Focus of CoMP Studies," 3GPP TSG-RAN WG1 #63bis, Jan. 21, 2011, section 2.
ZTE: "Views on Rel-11 CoMP", 3GPP TSG RAN WG1 Meeting #63bis, R1-110172, Jan. 17-21, 2011.

* cited by examiner

*Primary Examiner* — Ronald B Abelson
(74) *Attorney, Agent, or Firm* — Dentons US LLP

(57) ABSTRACT

A method of performing measurement at a user equipment (UE) in a wireless communication system is disclosed. The method includes receiving channel status information-reference signals (CSI-RSs) for channel status information feedback from plurality of transmission points (TPs), performing radio resource management (RRM) measurement based on the CSI-RSs, and selecting one or more TPs for receiving a signal from among the plurality of TPs based on the result of measurement.

12 Claims, 11 Drawing Sheets

[Fig. 1]
PRIOR ART
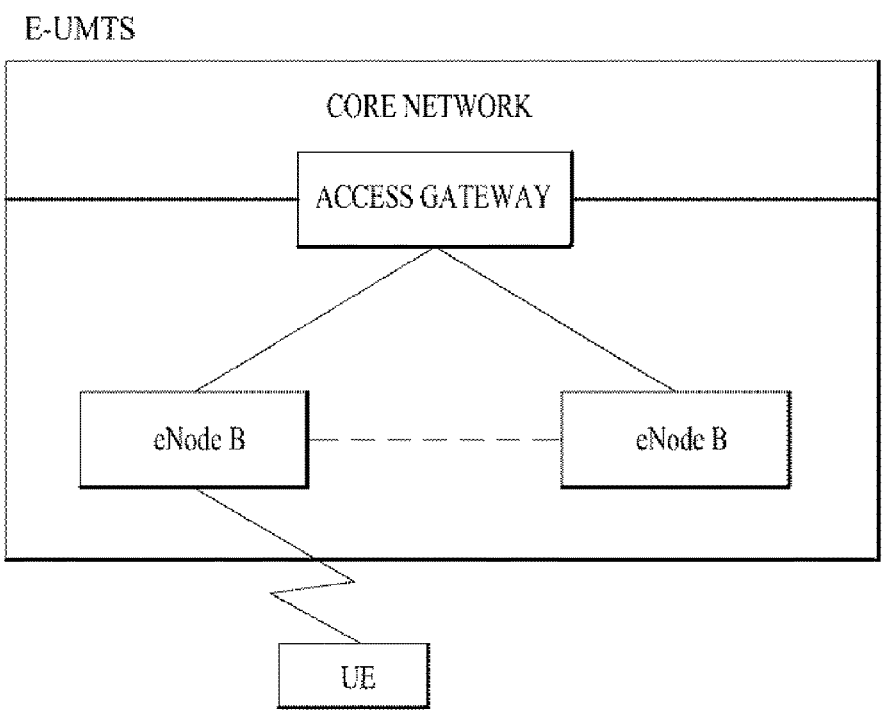

[Fig. 2]
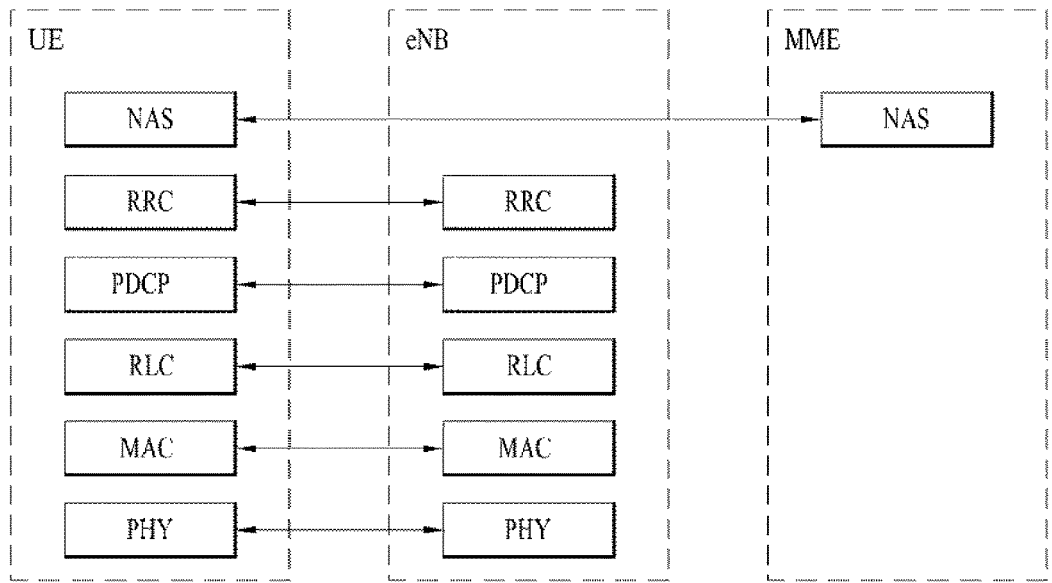
(a) CONTROL-PLANE PROTOCOL STACK
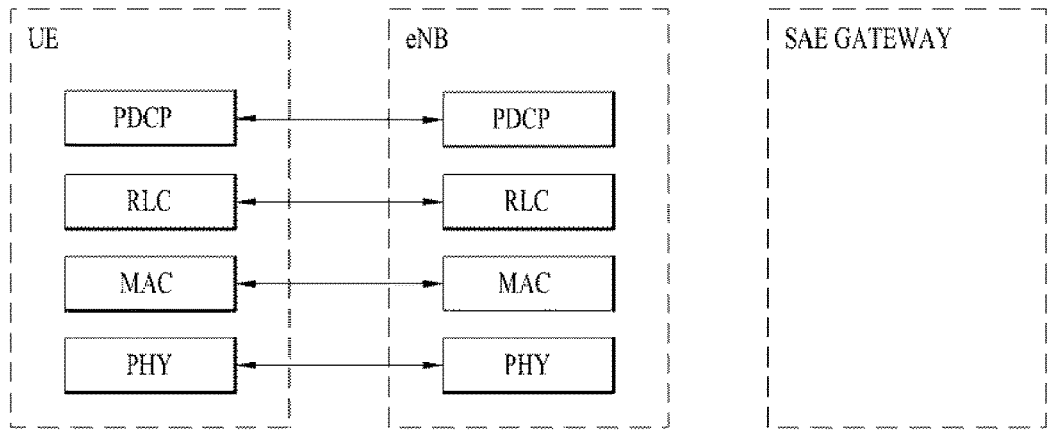
(b) USER-PLANE PROTOCOL STACK

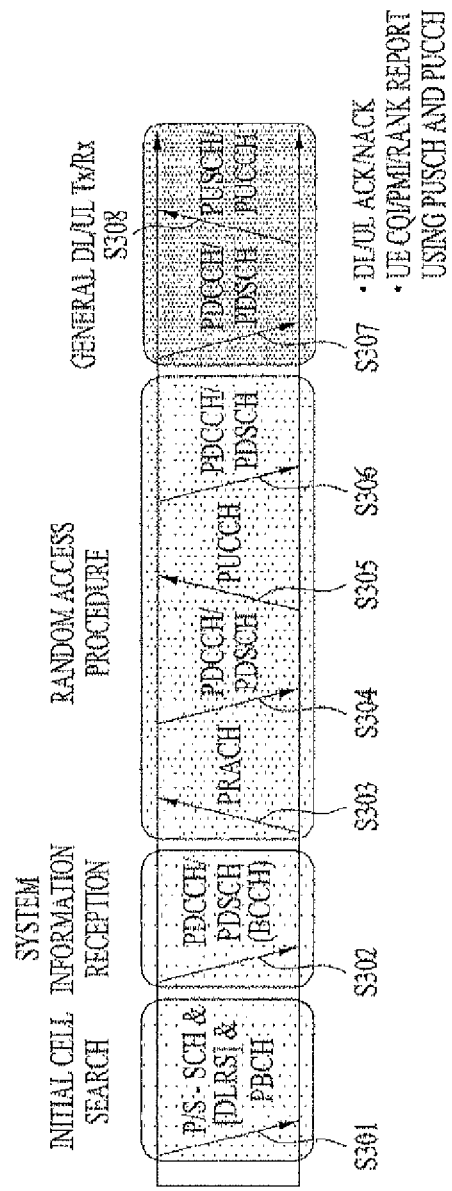
[Fig. 3]

[Fig. 4]
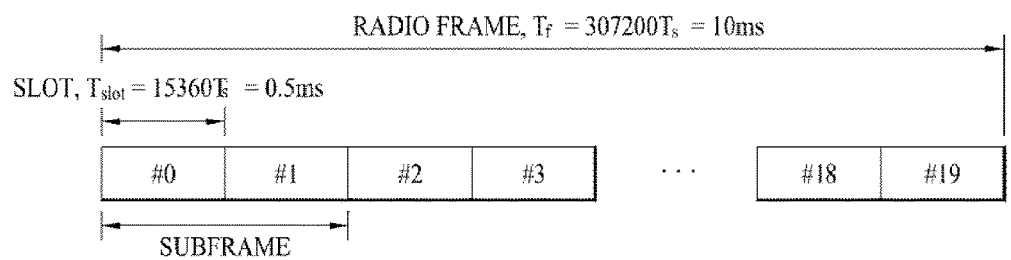

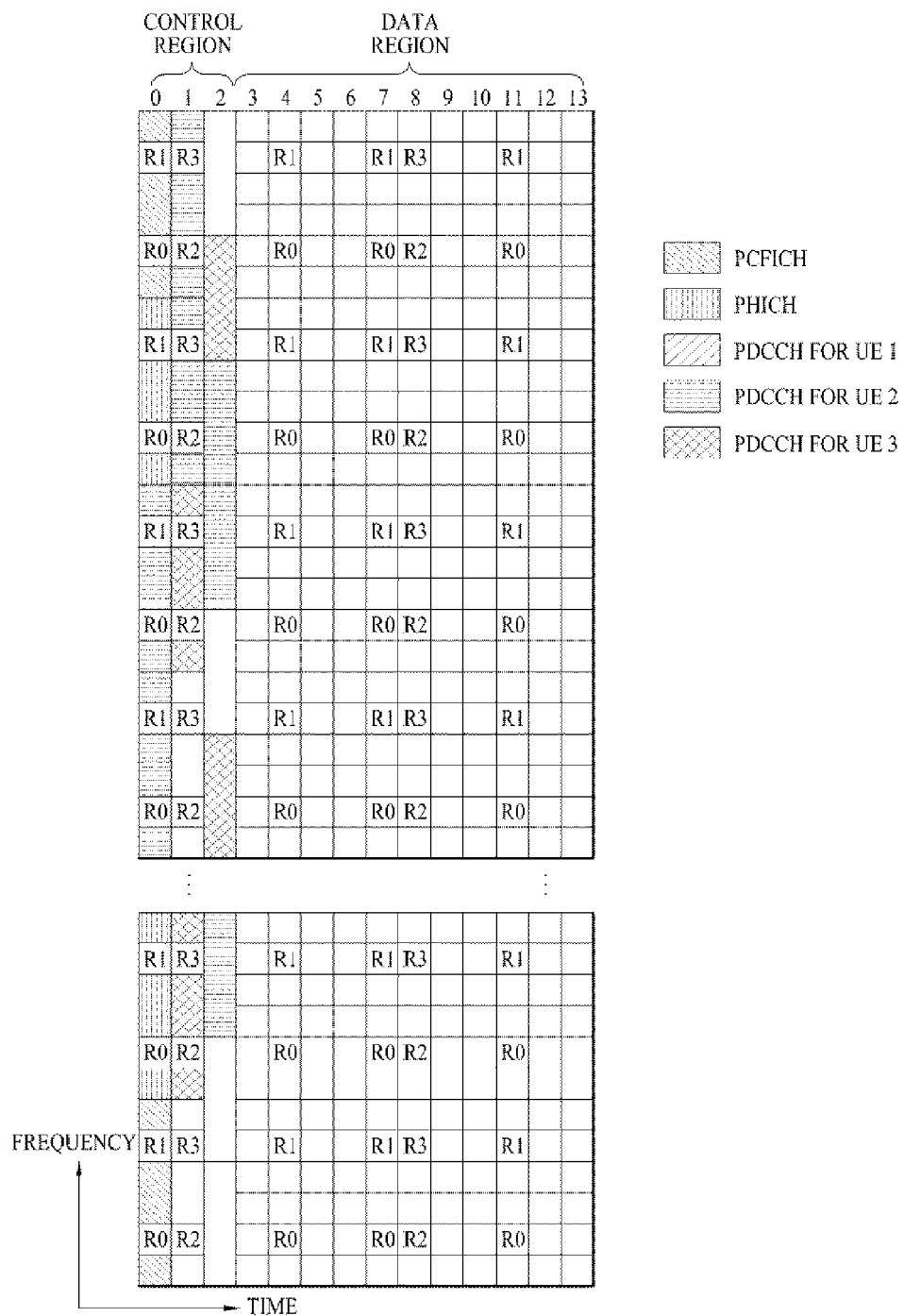
[Fig. 5]

[Fig. 6]
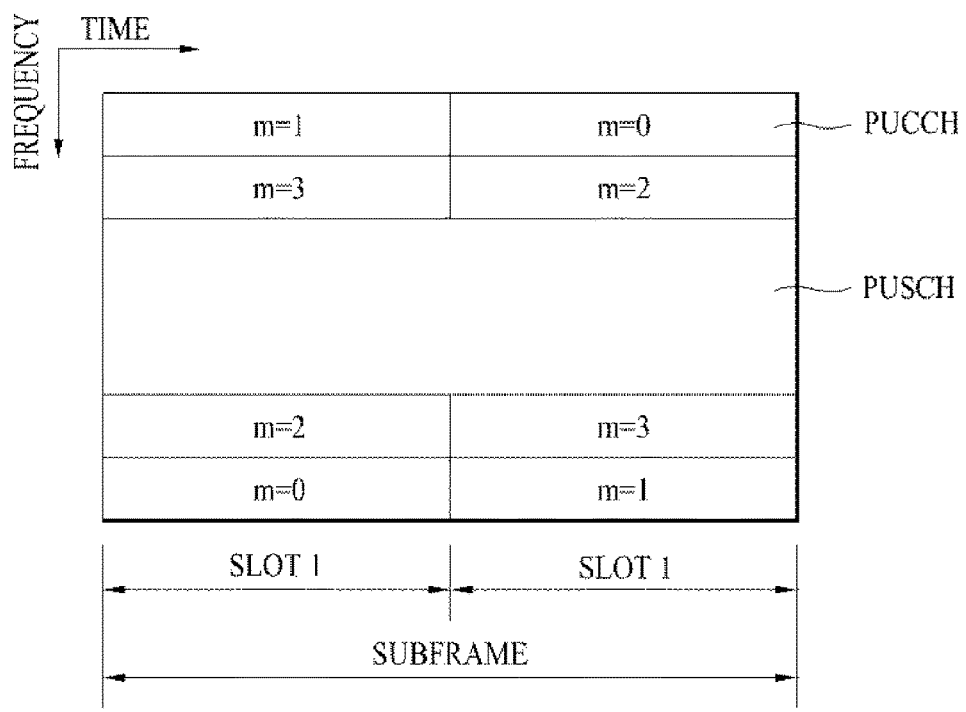

[Fig. 7]
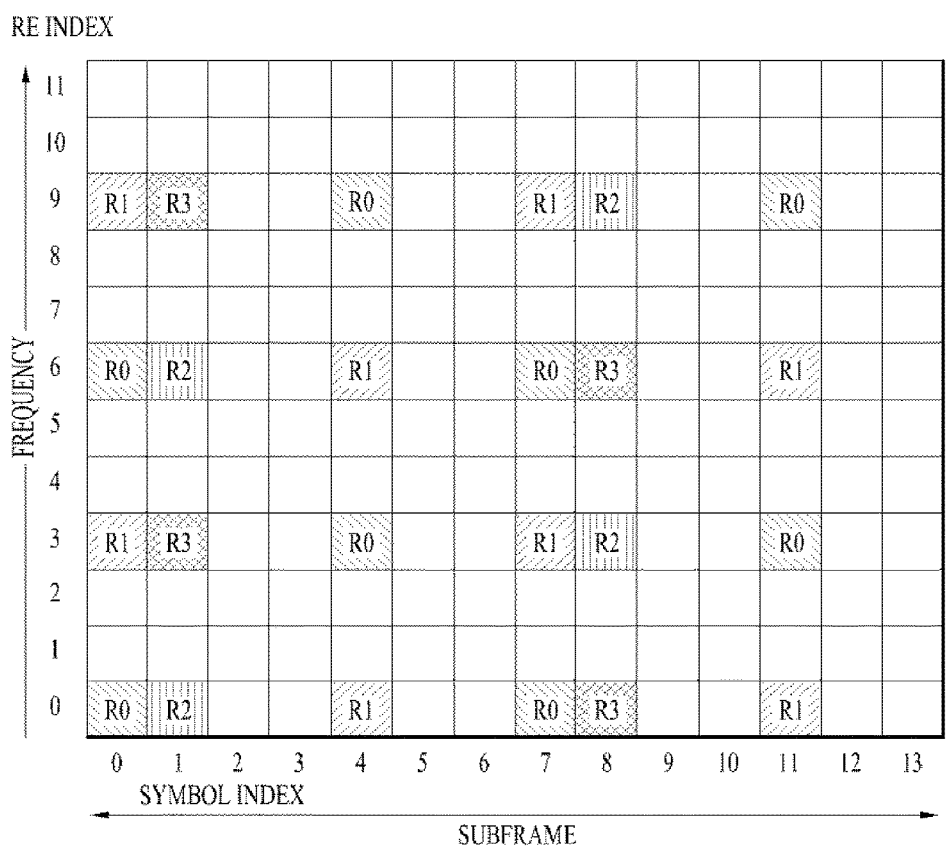

[Fig. 8]
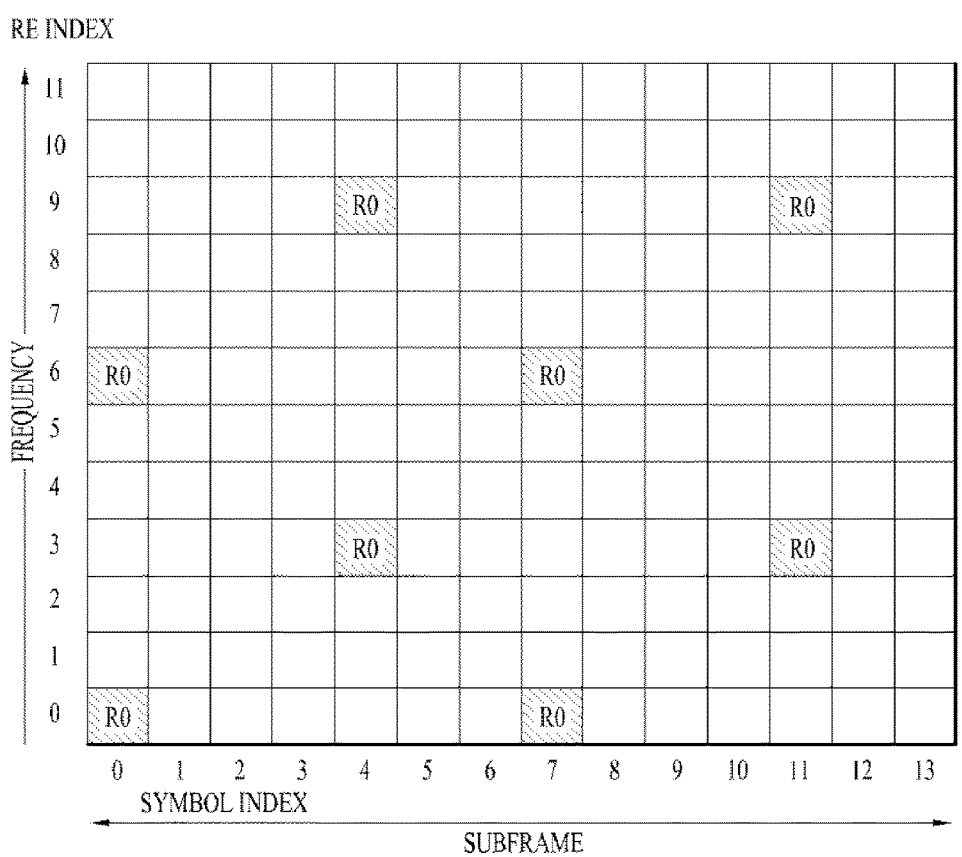

[Fig. 9]
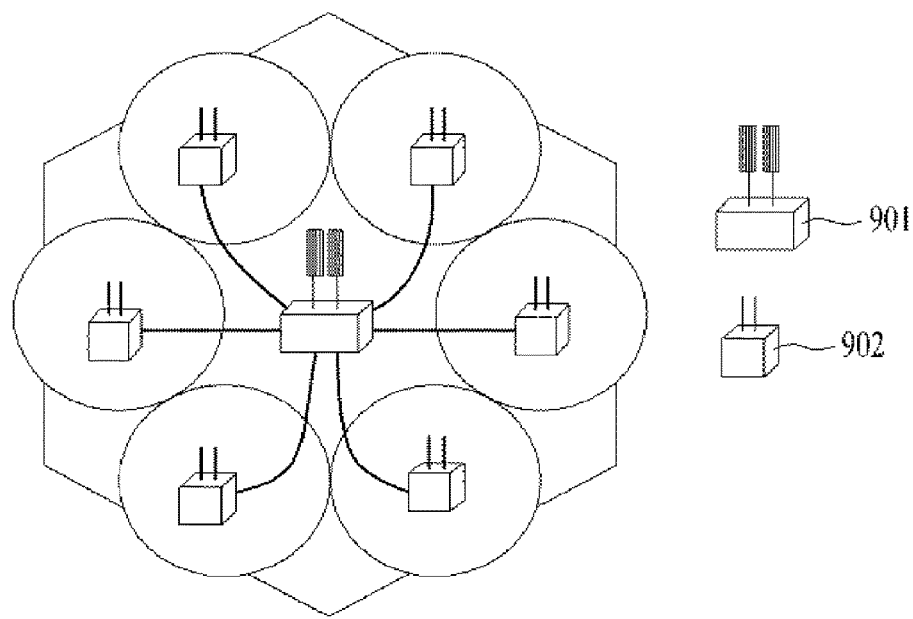
[Fig. 10]
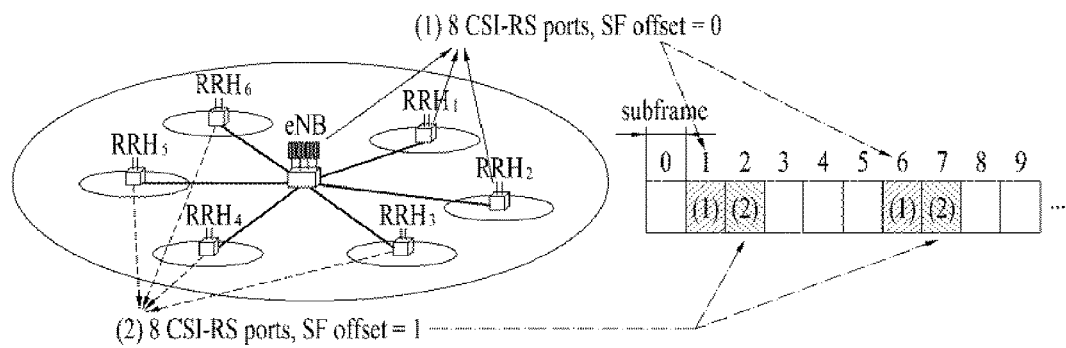

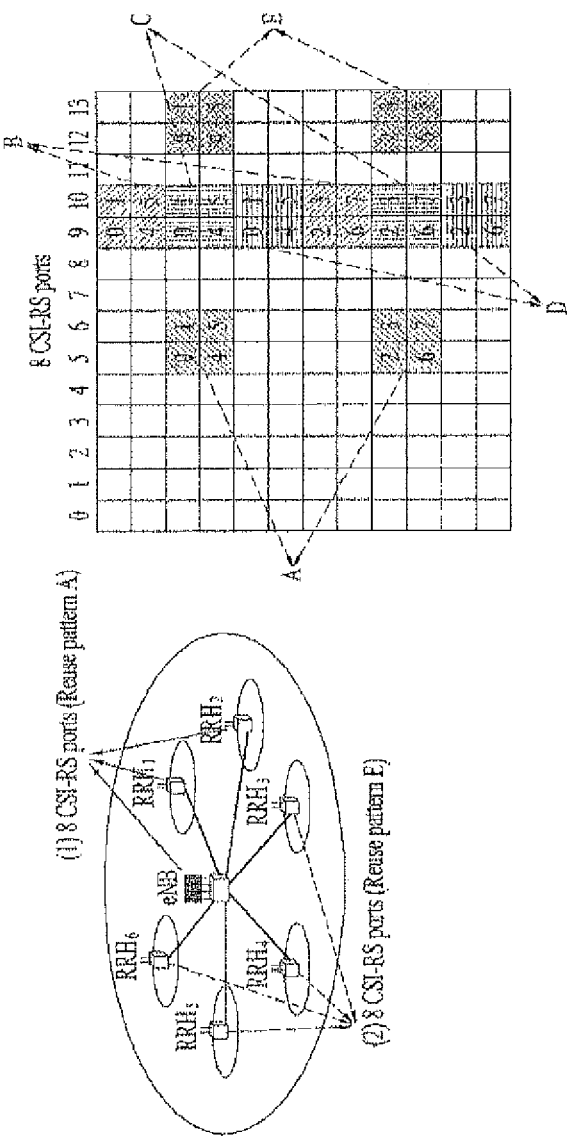
[Fig. 11]

[Fig. 12]
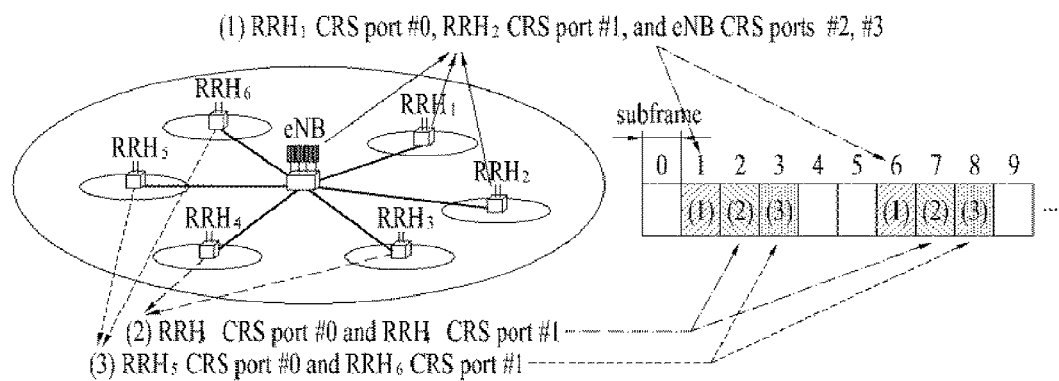
[Fig. 13]
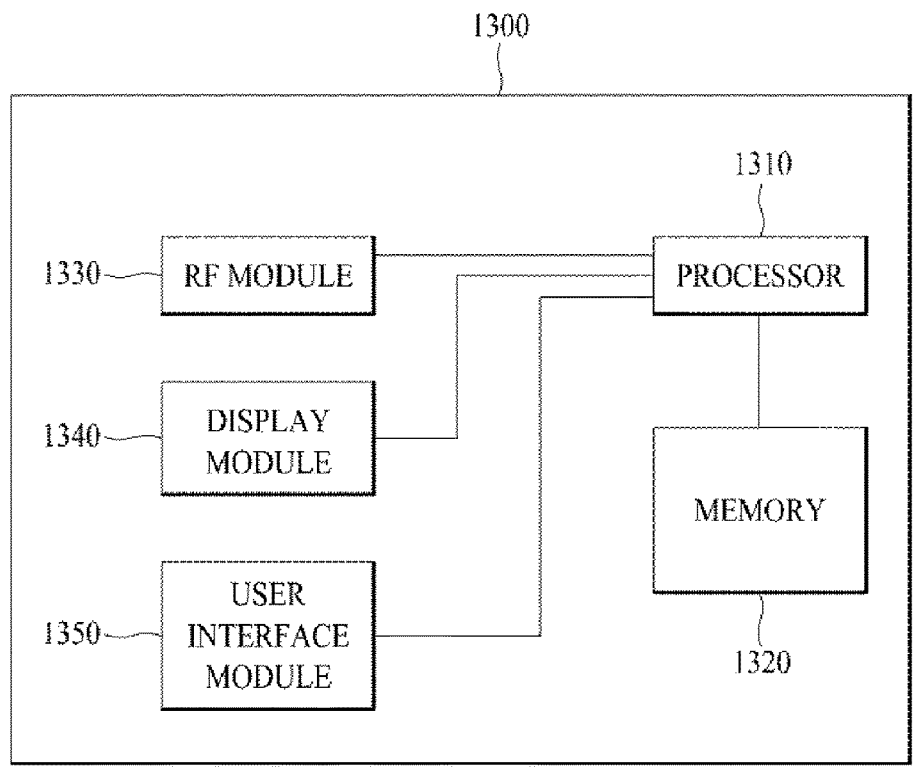

METHOD OF PERFORMING MEASUREMENT AT UE IN WIRELESS COMMUNICATION SYSTEM AND APPARATUS THEREOF

This application is a Continuation Application of U.S. application Ser. No. 13/992,520 filed on Jun. 7, 2013, which is a 35 USC § 371 National Stage entry of International Application No. PCT/KR2012/000832 filed on Feb. 6, 2012, which claims priority to U.S. Provisional Application No. 61/445,534, filed on Feb. 22, 2011 and 61/446,497, filed on Feb. 24, 2011; and Korean Patent Application No. 10-2012-0004970, filed on Jan. 16, 2012, all of which are incorporated by reference in their entirety herein.

TECHNICAL FIELD

The present invention relates to a wireless communication system, and more particularly, to a method of performing measurement at a user equipment (UE) in a wireless communication system and an apparatus thereof.

BACKGROUND ART

As an example of a mobile communication system to which the present invention is applicable, a 3rd Generation Partnership Project (3GPP) Long Term Evolution (LTE) communication system will be briefly described.

FIG. 1 is a diagram showing a network structure of an Evolved Universal Mobile Telecommunications System (E-UMTS) as an example of a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other wireless access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF INVENTION

Technical Problem

An object of the present invention devised to solve the problem lies in a method of performing measurement at a user equipment (UE) in a wireless communication system and an apparatus thereof.

Solution to Problem

The object of the present invention can be achieved by providing a method of performing measurement at a user equipment (UE) in a wireless communication system, the method including receiving channel status information-reference signals (CSI-RSs) for channel status information feedback from a plurality of transmission points (TPs), performing radio resource management (RRM) measurement based on the CSI-RSs, and selecting one or more TPs for receiving a signal from among the plurality of TPs based on the result of measurement.

The method may further include receiving CSI-RS setting information for the plurality of TPs through a higher layer. The CSI-RS setting information may include an indicator indicating whether the CSI-RSs are used for RRM measurement in addition to channel status information feedback.

The plurality of TPs may have the same cell identifier and transmit the same cell-specific RS to the UE.

The CSI-RSs transmitted from the plurality of TPs may be distinguished by at least one of an antenna port, a subframe offset and a CSI-RS reuse pattern.

Performing the RRM measurement may include measuring at least one of received signal strength indicator (RSST), reference signal received power (RSRP), reference signal received quality (RSRQ) and path loss.

In another aspect of the present invention, provided herein is a user equipment (UE) in a wireless communication system, including a wireless communication module configured to receive channel status information-reference signals (CSI-RSs) for channel status information feedback from a plurality of transmission points (TPs), and a processor configured to perform radio resource management (RRM) measurement based on the CSI-RSs and select one or more TPs for receiving a signal from among the plurality of TPs based on the result of measurement.

The wireless communication module may receive CSI-RS setting information for the plurality of TPs through a higher layer.

The processor may measure at least one of received signal strength indicator (RSSI), reference signal received power (RSRP), reference signal received quality (RSRQ) and path loss as the RRM measurement.

Advantageous Effects of Invention

According to the embodiments of the present invention, it is possible to efficiently perform measurement at a UE in a wireless communication system.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a diagram showing a network structure of an Evolved Universal Mobile Telecommunications System (E-UMTS) as an example of a wireless communication system;

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard;

FIG. 3 is a diagram showing physical channels used in a 3GPP system and a general signal transmission method using the same;

FIG. 4 is a diagram showing the structure of a radio frame used in a Long Term Evolution (LTE) system;

FIG. 5 is a diagram showing the structure of a downlink radio subframe in an LTE system;

FIG. 6 is a diagram showing the structure of an uplink subframe in an LTE system;

FIG. 7 is a diagram showing a general CRS pattern in the case in which the number of transmission antenna ports is 4 in an LTE system;

FIG. 8 is a diagram showing a CRS pattern for a transmission antenna port 0 in an LTE system;

FIG. 9 is a diagram showing the configuration of a heterogeneous network to which a CoMP scheme is applied;

FIG. 10 is a diagram showing a measurement method according to a first embodiment of Set 2 of the present invention;

FIG. 11 is another diagram showing the measurement method according to the first embodiment of Set 2 of the present invention;

FIG. 12 is a diagram showing a measurement method according to a second embodiment of Set 2 of the present invention; and FIG. 13 is a block diagram showing the configuration of a communication apparatus according to an embodiment of the present invention.

BEST MODE FOR CARRYING OUT THE INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel status in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303), and receive a response message of the preamble through the PDCCH and the PDSCH corresponding thereto (S304). In the case of contention-based RACH, a contention resolution procedure may be further performed.

The UE which performs the above procedures may perform PDCCH/PDSCH reception (S307) and Physical Uplink Shared Channel (PUSCH)/Physical Uplink Control Channel (PUCCH) transmission (S308) as a general uplink/downlink signal transmission procedure. In particular, the UE receives downlink control information (DCI) through a PDCCH. The DCI includes control information such as resource allocation information of the UE and the format thereof varies according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

FIG. 4 is a diagram showing the structure of a radio frame used in a Long Term Evolution (LTE) system.

Referring to FIG. 4, the radio frame has a length of 10 ms ($327200*T_s$) and includes 10 subframes with the same size. Each of the subframes has a length of 1 ms and includes two slots. Each of the slots has a length of 0.5 ms ($15360*T_s$). $T_s$ denotes a sampling time, and is represented by $T_s=1/(15 \text{ kHz}*2048)=3.2552*10^{-8}$ (about 33 ns). Each slot includes a plurality of OFDM symbols in a time domain, and includes a plurality of resource blocks (RBs) in a frequency domain. In the LTE system, one RB includes 12 subcarriers*7(6) OFDM symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel status in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303), and receive a response message of the preamble through the PDCCH and the PDSCH corresponding thereto (S304). In the case of contention-based RACH, a contention resolution procedure may be further performed.

The UE which performs the above procedures may perform PDCCH/PDSCH reception (S307) and Physical Uplink Shared Channel (PUSCH)/Physical Uplink Control Channel (PUCCH) transmission (S308) as a general uplink/downlink signal transmission procedure. In particular, the UE receives downlink control information (DCI) through a PDCCH. The DCI includes control information such as resource allocation information of the UE and the format thereof varies according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

FIG. 4 is a diagram showing the structure of a radio frame used in a Long Term Evolution (LTE) system.

Referring to FIG. 4, the radio frame has a length of 10 ms ($327200*T_s$) and includes 10 subframes with the same size. Each of the subframes has a length of 1 ms and includes two slots. Each of the slots has a length of 0.5 ms (15360*Ts). $T_s$ denotes a sampling time, and is represented by $T_s=1/(15 kHz*2048)=3.2552*10^{-8}$ (about 33 ns). Each slot includes a plurality of OFDM symbols in a time domain, and includes a plurality of resource blocks (RBs) in a frequency domain. In the LTE system, one RB includes 12 subcarriers*7(6) OFDM symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe settings. In FIGS. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The PCFICH informs the UE of the number of OFDM symbols used for the PDCCH per subframe. The PCFICH is located at a first OFDM symbol and is set prior to the PHICH and the PDCCH. The PCFICH includes four Resource Element Groups (REGs) and the REGs are dispersed in the control region based on a cell identity (ID). One REG includes four resource elements (REs). The RE denotes minimum physical resources defined as one subcarrier?one OFDM symbol. The PCFICH value indicates a value of 1 to 3 or 2 to 4 according to bandwidth and is modulated using a Quadrature Phase Shift Keying (QPSK) scheme.

The PHICH is used to carry HARQ ACK/NACK for uplink transmission. That is, the PHICH denotes a channel through which DL ACK/NACK information for UL HARQ is transmitted. The PHICH includes one REG and is scrambled on a cell-specific basis. ACK/NACK is indicated by one bit and is modulated using a Binary Phase Shift Keying (BPSK) scheme. The modulated ACK/NACK is spread with a spreading factor (SF) of 2 or 4. A plurality of PHICHs mapped to the same resources configures a PHICH group. The number of PHICHs multiplexed in the PHICH group is determined according to the number of SFs. The PHICH (group) is repeated three times in order to obtain diversity gain in the frequency domain and/or the time domain.

The PDCCH is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The PCH and the DL-SCH are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the data is transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and a DCI format, that is, transmission format information (e.g., transmission block size, modulation scheme, coding information, or the like) "C" is transmitted via a specific subframe. In this case, a UE located within a cell monitors a PDCCH using its own RNTI information, and if one or more UEs having "A" RNTI are present, the UEs receive the PDCCH and receive the PDSCH indicated by "B" and "C" through the information about the received PDCCH.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or sub-carriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

Hereinafter, a reference signal (RS) will be described.

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

Recently, in most mobile communication systems, when packets are transmitted, a method for improving data transmission/reception efficiency using multiple transmission antennas and multiple reception antennas has been used, unlike the related art using one transmission antenna and one reception antenna. In the case in which the transmitter or the receiver uses multiple antennas so as to increase capacity or improve performance, in order to accurately receive the signal, the channel statuses between the transmission antennas and the reception antennas should be acquired from the respective RSs of the transmission antennas.

In a wireless communication system, RSs may be largely divided into two RSs according to their purposes: a RS for acquiring channel information and an RS used for data demodulation. The former is used for enabling a User Equipment (UE) to acquire downlink channel information, and thus should be transmitted in a wideband. Accordingly, even a UE which does not downlink data in a specific subframe should receive this RS and perform channel measurement. In addition, this RS is also used for measurement for mobility management such as handover or the like.

The latter is an RS which is sent together when a base station (eNB) sends downlink data. The UE may receive this RS so as to perform channel estimation and demodulate the data. This RS should be transmitted in a region in which data is transmitted.

In an LTE system, two downlink RSs are defined for a unicast service. More specifically, there are a common RS (CRS) for measurement associated with handover and channel status information acquisition and a dedicated RS (DRS) used for data demodulation. The CRS may be referred to as a cell-specific RS and the DRS may be referred to as a UE-specific RS.

In an LTE system, the DRS is used only for data demodulation and the CRS is used for channel information acquisition and data demodulation. This CRS is transmitted in every subframe over a wideband as a cell-specific RS. In addition, the CRS is transmitted based on a maximum of four antenna ports according to the number of transmission antennas. For example, if the number of transmission antennas of a base station is two, CRSs for antenna ports 0 and 1 are transmitted and, if the number of transmission antennas is four, CRSs for antenna ports 0 to 3 are transmitted.

FIG. 7 is a diagram showing a general CRS pattern in the case in which the number of transmission antenna ports is 4 in an LTE system.

Referring to FIG. 7, if CRSs are mapped to time-frequency resources in the LTE system, an RS for one antenna port on a frequency axis is transmitted in a state of being mapped to one RE among 6 REs. Since one RB includes 12 REs on the frequency axis, two REs of one RB are used as REs for one antenna port.

FIG. 8 is a diagram showing a CRS pattern for a transmission antenna port 0 in an LTE system.

In an LTE-A system, an evolved form of the LTE system, a base station (eNB) should be designed to support a maximum of eight transmission antennas in downlink. Accordingly, RS transmission for a maximum of eight transmission antennas should also be supported.

More specifically, since only RSs for a maximum of four antenna ports are defined as downlink RSs in the LTE system, if an eNB has four to eight downlink transmission antennas in the LTE-A system, RSs for these antennas should be additionally defined. RSs for channel measurement and RSs for data demodulation should be designed as the RSs for a maximum of eight transmission antenna ports.

One important consideration in design of the LTE-A system is backward compatibility. That is, an LTE UE should operate well even in the LTE-A system and the LTE-A system should support the LTE UE. In terms of RS transmission, in a time-frequency domain in which CRSs defined in the LTE system are transmitted, RSs for a maximum of eight transmission antenna ports should be additionally defined. However, in the LTE-A system, if an RS pattern for a maximum of eight transmission antennas is added to the entire band per subframe using the same method as the CRS of the conventional LTE system, overhead is excessively increased.

Accordingly, RSs newly designed in the LTE-A system are roughly divided into two types: a channel measurement RS (Channel Status Information-RS (CSI-RS)) for selecting an MCS, a Precoding Matrix Indicator (PMI) or the like and a Demodulation RS (DM-RS) for demodulation of data transmitted via eight transmission antennas.

The CSI-RS is used only for channel measurement, whereas the existing CRS is used for channel measurement, handover measurement or data demodulation. Since the CSI-RS is transmitted to acquire channel status information, the CST-RS may not be transmitted per subframe, unlike the CRS. Currently, in the LTE-A standard, CSI-RSs may be allocated to antenna ports 15 to 22 and CSI-RS setting information is defined to be received through higher layer signaling.

In addition, for data demodulation, a DM-RS is transmitted to a UE scheduled in a corresponding time-frequency domain as a DRS. That is, the DM-RS transmitted to a specific UE is transmitted only in a domain scheduled to the UE, that is, in a time-frequency domain in which the UE receives data.

Meanwhile, in an LTE-A system which is a next-generation mobile communication system, in order to improve a data transfer rate, a Coordinated Multi Point (CoMP) transmission scheme which was not supported in the conventional standard will be supported. Here, the CoMP transmission scheme refers to a transmission scheme for performing communication with a UE by coordination between two or more eNBs or cells in order to improve communication performance between a UE located in a shadow region and an eNB (cell or sector).

The CoMP transmission scheme may be divided into a cooperative MIMO-based Joint Processing (JP) scheme through data sharing and a CoMP-Coordinated Scheduling/Coordinated Beamforming (CoMP-CS/CB) scheme.

In case of downlink, in the CoMP-JP scheme, a UE may instantaneously and simultaneously receive data from eNBs, each of which implements a CoMP transmission scheme, and combine the signals received from the eNBs so as to improve reception performance (Joint Transmission (JT)). In addition, a method of transmitting data from one of eNBs, each of which performs a CoMP transmission scheme, to a UE at a specific time may be considered (Dynamic Point Selection (DPS)). In the CoMP-CS/CB scheme, a UE may instantaneously receive data from one eNB, that is, a serving eNB, through beamforming.

In case of uplink, in the CoMP-JP scheme, eNBs may simultaneously receive a PUSCH signal from a UE (Joint Reception (JR)). In the CoMP-CS/CB scheme, only one eNB receives a PUSCH. At this time, a determination as to whether a CoMP/CS-CB scheme is used is made by coordinated cells (or eNBs).

Meanwhile, the CoMP scheme is applicable to a heterogeneous network as well as a homogeneous network including only a macro eNB.

FIG. 9 is a diagram showing the configuration of a heterogeneous network to which a CoMP scheme is applied. In particular, FIG. 9 shows a network including a macro eNB 901 and radio remote heads (RRHs) 902 for transmitting and receiving a signal with a relatively low transmission power. A pico eNB or RRH located in a coverage of the macro eNB may be connected to the macro eNB via an optical cable, etc. In addition, the RRH may also be referred to as a micro eNB.

Referring to FIG. 9, since transmission power of the micro eNB such as the RRH is relatively lower than that of the macro eNB, it can be seen that the coverage of each RRH is relatively smaller than that of the macro eNB.

In such a CoMP scenario, as compared to a system in which only a macro eNB is present, a coverage hole of a specific region is covered through added RRHs or a plurality of transmission points (TPs) including RRHs and a macro eNB is used, thereby increasing overall system throughput through cooperative transmission.

Meanwhile, in FIG. 9, RRHs may be classified into two cases: the case in which all RRHs are allocated cell identifiers (IDs) different from that of a macro eNB and are regarded as small cells and the case in which all RRHs have the same cell ID as a macro eNB.

In the case in which the RRHs are allocated cell IDs different from the macro eNB, the UE recognizes the RRHs as independent cells. A UE located at the boundary of each cell receives severe interference from a neighboring cell. Various CoMP schemes for reducing such interference and increasing a transfer rate have been proposed.

Next, in the case in which the RRHs are allocated the same cell ID as the macro eNB, as described above, the UE recognizes the RRHs and the macro eNB as one cell. The UE receives data from each RRH and the macro eNB. In case of a data channel, precoding used for data transmission of each UE is simultaneously applied to an RS and each UE may estimate an actual channel thereof, via which data is transmitted. The RS to which precoding is applied is the above-described DM-RS.

As described above, a UE of a conventional LTE system performs channel estimation only using a CRS and thus performs data demodulation and channel status information feedback. In addition, this UE performs cell tracking, frequency offset compensation, synchronization, radio resource management (RRM) measurement such as received signal strength indicator (RSSI)/reference signal received power (RSRP)/reference signal received quality (RSRQ) measurement, etc.

Meanwhile, a UE of an LTE-A system performs channel estimation and data demodulation, both of which have been conventionally performed as the roles of the CRS, using a DM-RS and performs channel status information feedback using a CSI-RS. However, the other functions are still performed using the CRS.

In the present invention, when a CoMP scheme considered in an LTE-A system is used, if TPs included in a CoMP set or a CoMP measurement set have different cell IDs or have the same cell ID, a UE of an LTE-A system performs measurement report divided into Set 1 and Set 2 using a CRS or a CSI-RS as follows.

<Set 1: CRS-Based Measurement>

A measurement report of Set 1 is measurement for inter-cell mobility handling such as handover and is performed based on a CRS which is a cell-specific RS. This is commonly applicable to both a UE of a conventional LTE system and a UE of an LTE-A system. Similarly to the related art, cell tracking, frequency offset compensation, synchronization, RRM measurement such as RSSI/RSRP/RSRQ measurement, etc. are performed based on a CRS.

Here, RRM measurement and handover are performed with respect to CoMP cells having different cell TDs. That is, if TPs having the same cell ID, including RRHs, are present in a coverage of a macro eNB, movement of a UE between the TPs included in the coverage is not handover and RSSI/RSRP/RSRQ is measured only with respect to CoMP cells having different cell IDs.

Meanwhile, if all CoMP TPs having the same cell ID transmit the same CRS or only a macro eNB transmits a CRS, since the CRSs cannot be distinguished between the CoMP TPs, the CoMP TPs having the same cell IDs may be regarded as a single cell and a conventional handover procedure is performed only upon movement to the coverage of an adjacent TP having another cell ID. Accordingly, TP selection (that is, CoMP set selection) cannot be performed using the measurement method of Set 1.

In the case in which all CoMP TPs having the same cell ID transmit the same CRS, CRS-based channel estimation of a UE is performed by a combined channel of a vector sum of all the channel paths from all the CoMP TPs and thus the UE only acquires the combined channel information.

If a macro eNB alone transmits a CRS, only channel information from the macro eNB is acquired through CRS-based channel estimation of a UE. This is equal to an operation of a general wireless communication system in which one TP is present in a cell without RRHs.

In an embodiment of an LTE-A system, measurement of Set 1 may be limited to being performed only in non-MBSFN subframes having subframe indexes #0, #4, #5, #9, . . . or may be set to be performed only in predetermined subframes.

<Set 2: CSI-RS-Based Measurement>

A measurement report of Set 2 is used for TP selection (that is, CoMP set selection) for channel status information (CSI) feedback of CoMP TPs. For TP selection, RRM measurement such as RSSI/RSRP/RSRQ, path loss and interference measurement is performed based on a CSI-RS which is a TP-specific RS or a modification of a CRS which is a cell-specific RS. The measurement report of Set 2 is applicable only to a UE of an LTE-A system.

In particular, a CSI-RS is generally used for channel status information feedback as described above and may be used for TP selection by performing RRM measurement in the measurement report of Set 2. Therefore, information indicating that a CSI-RS is used for RRM measurement is provided to a UE through higher layer signaling, along with CSI-RS setting information.

RRM measurement of each of the CoMP TPs having the same cell identifier may be performed through the measurement report of Set 2 and thus optimal TP selection for one UE are possible. In addition, it is possible to perform uplink power control sufficient for effective uplink reception quality of a corresponding TP based on a path loss estimation value of a TP having best reception quality.

The measurement method of Set 2 may be divided as follows.

1) First, a first embodiment of Set 2 is the case in which a plurality of CSI-RS settings based on a subframe offset and/or various CSI-RS reuse patterns are used. That is, CSI-RSs may be used not only for measurement for channel status information feedback but also for RRM measurement and may be particularly used for a TP selection procedure.

FIG. 10 is a diagram showing a measurement method according to a first embodiment of Set 2 of the present invention. In particular, it is assumed that a transmission period of a CSI-RS is 5 subframes.

Referring to FIG. 10, for the purpose of RRM measurement of each of all CoMP TPs having the same cell ID, respective CSI-RS settings of TPs are signaled by setting a subframe (SF) offset of each TP.

More specifically, a macro eNB, RRH1 and RRH2 transmit CSI-RSs at subframe indexes 1 and 6 by applying a subframe offset 0 to CSI-RS settings defined by eight antenna ports. RRH3 to RRH6 transmit CSI-RSs at subframe indexes 2 and 7 by applying a subframe offset 1 to CSI-RS settings defined by eight antenna ports.

FIG. 11 is another diagram showing the measurement method according to the first embodiment of Set 2 of the present invention.

Referring to FIG. 11, a macro eNB, RRH1 and RRH2 transmit CSI-RSs by applying a reuse pattern A to CSI-RS settings defined by eight antenna ports and RRH3 to RRH6 transmit CSI-RSs by applying a reuse pattern E to CSI-RS settings defined by eight antenna ports.

Since a subframe offset is not applied, all TPs may transmit CSI-RSs at the same subframes, for example, subframe indexes 1 and 6, and the CSI-RSs may be distinguished by the reuse pattern.

Measurement using combination of the subframe offset and the reuse pattern may also be considered. That is, if the subframe offset and the reuse pattern are simultaneously applied, even when the number of RRHs is increased and the number of antennas of each RRH is increased, individual channel estimation and RRM measurement through independent CSI-RS settings are possible.

In consideration that a path loss difference between RRHs that are distant from each other is large, CSI-RS settings may be reused.

2) Next, a second embodiment of Set 2 is the case in which each TP transmits only a CRS of a specific port according to given bitmap information, for the purpose of performing TP selection (that is, CoMP set selection) or RRM measurement such as path loss and interference measurement. According to the second embodiment, several TPs distinguished by different CRS ports may be grouped and measurement may be performed.

FIG. 12 is a diagram showing a measurement method according to a second embodiment of Set 2 of the present invention.

Referring to FIG. 12, it can be seen that each RRH or the macro eNB selects and transmits a CRS defined by a specific CRS port so as to perform TP selection and RRM measurement using the CRS.

More specifically, in a CRS setting (1), RRH1 transmits a CRS defined by a CRS port #0, RRH2 transmits a CRS defined by a CRS port #1, the macro eNB transmits CRSs defined by CRS ports #2 and #3 at subframe indexes 1 and 6.

In a CRS setting (2), RRH3 transmits a CRS defined by a CRS port #0 and RRH4 transmits a CRS defined by a CRS port #1 at subframe indexes 2 and 7.

In a CRS setting (3), RRH5 transmits a CRS defined by a CRS port #0 and RRH6 transmits a CRS defined by a CRS port #1 at subframe indexes 3 and 8.

In summary, the measurement method of Set 1 and the measurement method of Set 2 of the present invention are used for different purposes. That is, the measurement method of Set 1 is used for inter-cell mobility handling and measurement report per cell, and the measurement method of Set 2 is used for RRM measurement in the same cell, such as CoMP set management, that is, TP management.

FIG. 13 is a block diagram showing the configuration of a communication apparatus according to an embodiment of the present invention.

Referring to FIG. 13, a communication apparatus 1300 includes a processor 1310, a memory 1320, a radio frequency (RF) module 1330, a display module 1340 and a user interface module 1350.

The communication apparatus 1300 is shown for convenience of description and some modules thereof may be omitted. In addition, the communication apparatus 1300 may further include necessary modules. Some modules of the communication apparatus 1300 may be subdivided. The processor 1310 may be configured to perform the operation according to the embodiments of the present invention described with reference to the drawings. More specifically, for a detailed operation of the processor 1310, refer to the description of FIGS. 1 to 12.

The memory 1320 is connected to the processor 1310 so as to store an operating system, applications, program code, data, etc. The RF module 1330 is connected to the processor 1310 so as to convert a baseband signal into an RF signal or convert an RF signal into a baseband signal. For conversion, the RF module 1330 performs analog conversion, amplification, filtering and frequency up-conversion or inverse processes thereof. The display module 1340 is connected to the processor 1310 so as to display a variety of information. The display module 1340 may include, but is not limited to, well-known devices such as a liquid crystal display (LCD), a light emitting diode (LED), and an organic light emitting diode (OLED). The user interface module 1350 is connected to the processor 1310 and includes a combination of well-known user interfaces such as a keypad or a touchscreen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Mode for the Invention

Various embodiments have been described in the best mode for carrying out the invention.

INDUSTRIAL APPLICABILITY

Although an example of applying a method of performing measurement at a UE in a wireless communication system and an apparatus thereof to a 3GPP LTE system is described, the present invention is applicable to various wireless communication systems in addition to the 3GPP LTE system.

The invention claimed is:

1. A method of performing measurement at a user equipment (UE) in a wireless communication system, the method comprising:
   receiving configuration on channel status information-reference signals (CSI-RSs) for radio resource management (RRM) measurement through a higher layer;
   receiving the CSI-RSs for the RRM measurement from a network;
   performing the RRM measurement using the CSI-RSs; and
   reporting a result of the RRM measurement to the network,
   wherein the CSI-RSs are distinguished by at least one of a CSI-RS resource element pattern and a subframe offset,
   wherein the CSI-RSs are received from transmission ends having a same cell identity of the network.

2. The method according to claim 1, wherein at least one transmission end is selected from the transmission ends based on the result of the RRM measurement based on the CSI-RSs.

3. The method according to claim 1, wherein the configuration on the CSI-RSs includes an indicator indicating whether the CSI-RSs are used for RRM measurement or not.

4. The method according to claim 1, wherein performing the RRM measurement includes measuring at least one of received signal strength indicator (RSSI), reference signal received power (RSRP), reference signal received quality (RSRQ) and path loss.

5. The method according to claim 1, wherein performing the RRM measurement using the CSI-RSs comprises performing the RRM measurement using cell-specific reference signals (CRSs).

6. The method according to claim 5, wherein the CRSs are distinguished by different cell identities from each other.

7. A user equipment (UE) in a wireless communication system, comprising:
- a wireless communication module configured to receive configuration on channel status information-reference signals (CSI-RSs) for radio resource management (RRM) measurement through a higher layer, to receiving the CSI-RSs for the RRM measurement from a network and to report a result of the RRM measurement to the network; and
- a processor configured to perform the RRM measurement using the CSI-RSs,
- wherein the first reference signals are received from transmission ends having different cell identities of the network,
- wherein the CSI-RSs are distinguished by at least one of a CSI-RS resource element pattern and a subframe offset,
- wherein the CSI-RSs are received from transmission ends having a same cell identity of the network.

8. The UE according to claim 7, wherein at least one transmission end is selected from the transmission ends based on the result of the RRM measurement based on the CSI-RSs.

9. The UE according to claim 7, wherein the configuration on the CSI-RSs includes an indicator indicating whether the CSI-RSs are used for RRM measurement or not.

10. The UE according to claim 7, wherein the processor measures at least one of received signal strength indicator (RSSI), reference signal received power (RSRP), reference signal received quality (RSRQ) and path loss, for the RRM measurement.

11. The UE according to claim 7, wherein the processor performs the RRM measurement using cell-specific reference signals (CRSs).

12. The UE according to claim 11, wherein the CRSs are distinguished by different cell identities from each other.

* * * * *